US010488491B2

(12) United States Patent
Luo (10) Patent No.: US 10,488,491 B2
(45) Date of Patent: Nov. 26, 2019

(54) BALL GAME CAMERA SPEED MEASURING MACHINE

(71) Applicant: Chun Fang Luo, Dongguan (CN)

(72) Inventor: Chun Fang Luo, Dongguan (CN)

(*) Notice: Subject to any disclaimer, the term of this patent is extended or adjusted under 35 U.S.C. 154(b) by 159 days.

(21) Appl. No.: 15/557,135

(22) PCT Filed: Mar. 2, 2016

(86) PCT No.: PCT/CN2016/075292
§ 371 (c)(1),
(2) Date: Sep. 11, 2017

(87) PCT Pub. No.: WO2016/145987
PCT Pub. Date: Sep. 22, 2016

(65) Prior Publication Data
US 2018/0045809 A1     Feb. 15, 2018

(30) Foreign Application Priority Data

Mar. 13, 2015   (CN) ..................... 2015 2 0142943 U (51) Int. Cl.
| | | |
|---|---|---|
| A63B 24/00 | (2006.01) |
| G01S 7/04 | (2006.01) |
| A63B 71/06 | (2006.01) |
| G01S 13/58 | (2006.01) |
| H04N 5/225 | (2006.01) |
| H04N 5/232 | (2006.01) |
| G01S 13/86 | (2006.01) |
| G01S 7/02 | (2006.01) |

(52) U.S. Cl.
CPC .......... *G01S 7/043* (2013.01); *A63B 24/0062* (2013.01); *A63B 71/0622* (2013.01); *G01S 13/58* (2013.01); *G01S 13/585* (2013.01); *G01S 13/867* (2013.01); *H04N 5/2252* (2013.01); *H04N 5/23203* (2013.01); *A63B 2220/806* (2013.01); *G01S 2007/027* (2013.01)

(58) Field of Classification Search
None
See application file for complete search history.

(56) References Cited

U.S. PATENT DOCUMENTS

2007/0257814 A1* 11/2007 Tilton ..................... G08G 1/054
340/901

* cited by examiner

*Primary Examiner* — Chikaodili E Anyikire
(74) *Attorney, Agent, or Firm* — Leong C. Lei (57) ABSTRACT

The ball game camera speed measuring machine of the present invention comprises a PCB board, a speed measuring unit, a camera unit, a memory card, a display panel, a loudspeaker, a power source, an start/stop signal receiving unit configured to receive a start/stop signal, and a communication transmission unit configured to transmit a video signal and a speed signal. The PCB board is connected with the start/stop signal receiving unit, the speed measuring unit, the camera unit, the memory card, the display panel, the loudspeaker and the communication transmission unit respectively. The power source supplies power to the loudspeaker, the PCB board, the speed measuring unit and the camera unit. The camera speed measuring machine simultaneously displays in real time a ball speed on a dynamic video.

10 Claims, 7 Drawing Sheets

BALL GAME CAMERA SPEED MEASURING MACHINE

BACKGROUND OF THE INVENTION

1. Field of the Invention

The present invention relates to a camera, and more particularly to a ball game camera speed measuring machine.

2. Description of the Prior Art

These days, a camera device is used to photograph dynamic motions of a ball game to make a video, or a radar speed measuring device is used to measure the speed of the ball in a game. It is required to use two separate devices to get the video and the speed value. This approach is unable to synchronously display the speed of the ball in the dynamic video. It is difficult to accurately know the instantaneous corresponding speed of a different dynamic motion.

Accordingly, the inventor of the present invention has devoted himself based on his many years of practical experiences to solve these problems.

SUMMARY OF THE INVENTION

In view of the shortcomings of the prior art, the primary object of the present invention is to provide a ball game camera speed measuring machine. The speed of the ball can be displayed in a dynamic video in real time. It is convenient for people to watch and know the instantaneous corresponding speed of a different dynamic motion accurately.

In order to achieve the aforesaid object, the ball game camera speed measuring machine of the present invention comprises a PCB board, a speed measuring unit, a camera unit, a memory card, a display panel, a loudspeaker, a power source, an start/stop signal receiving unit configured to receive a start/stop signal, and a communication transmission unit configured to transmit a video signal and a speed signal. The PCB board is connected with the start/stop signal receiving unit, the speed measuring unit, the camera unit, the memory card, the display panel, the loudspeaker and the communication transmission unit respectively. The power source supplies power to the loudspeaker, the PCB board, the speed measuring unit and the camera unit.

The present invention has obvious advantages and beneficial effects as compared with the prior art. The present invention is provided with the PCB board, the speed measuring unit, the camera unit, the memory card, the display panel, the loudspeaker, the power source, the start/stop signal receiving unit and the communication transmission unit. When in use, by pressing a button of a watch or a mobile phone, the ON/OFF signal receiving unit receives the signal and starts to measure the speed and photograph synchronously. The camera signal and the speed measuring signal can be stored to the memory card and communicated to a mobile phone APP via the communication transmission unit to display the video of the speed measuring value on the mobile phone in real time. In this way, the speed of the ball can be displayed in the dynamic video in real time. It is convenient for people to watch and know the instantaneous corresponding speed of a different dynamic motion accurately, having great significance.

DETAILED DESCRIPTION OF THE PREFERRED EMBODIMENTS

Embodiments of the present invention will now be described, by way of example only, with reference to the accompanying drawings.

FIG. 1-8 illustrate a specific structure, application and working principle/process of an embodiment of the present invention. The present invention discloses a ball game camera speed measuring machine 100. The ball game camera speed measuring machine 100 comprises a housing, a PCB board 21, a speed measuring unit 22, a camera unit 23, a memory card 24, a display panel 25, a loudspeaker 26, a power source 27, an start/stop signal receiving unit 28 configured to receive a start/stop signal, and a communication transmission unit 29 configured to transmit outward a video signal and a speed signal.

The housing includes a front cover 11 and a rear cover. The front cover 11 and the rear cover are engaged with each other to form an accommodation chamber therebetween. All the PCB board 21, the speed measuring unit 22, the camera unit 23, the memory card 24, the loudspeaker 26, the power source 27, the start/stop signal receiving unit 28 and the communication transmission unit 29 are disposed in the accommodation chamber. The display panel 25 is disposed at the front of the front cover 11. The PCB board 21 is connected with the start/stop signal receiving unit 28, the speed measuring unit 22, the camera unit 23, the memory card 24, the display panel 25, the loudspeaker 26 and the communication transmission unit 29 respectively. The power source 27 supplies power to the loudspeaker 26, the PCB board 21, the speed measuring unit 22 and the camera unit 23.

In this embodiment, a camera aperture of the camera unit 23 and a sound outlet of the loudspeaker 26 are disposed on the front of the front cover 11. The rear cover has an L-shaped configuration, and includes a horizontal bottom board 12 and an oblique board which is obliquely connected to the horizontal bottom board 12. The front cover 11 is mated with and coupled to the oblique board. The oblique board includes a first oblique board 13 integrally connected to the horizontal bottom board 12 and a second oblique board 14 connected to an upper end of the first oblique board 13. The rear of the front cover 11 is formed with a first accommodation chamber 15 and a second accommodation chamber 16 which are spaced apart from each other. The first oblique board 13 is configured to cover the first accommodation chamber 15. The second oblique board 14 is configured to cover the second accommodation chamber 16. The speed measuring unit 22 is disposed in the first accommodation chamber 15. The camera unit 23 is disposed in the second accommodation chamber 16. The PCB board 21 is connected with a plurality of functional buttons, including a memory button 31, a dynamic/static speed measuring mode switching button 32, a kilometer/mile speed measuring unit switching button 33, a sound on/off button 34, and a power source on/off button 35. These functional buttons are arranged in a row on a rear side of the first oblique board 13.

Figure 7:
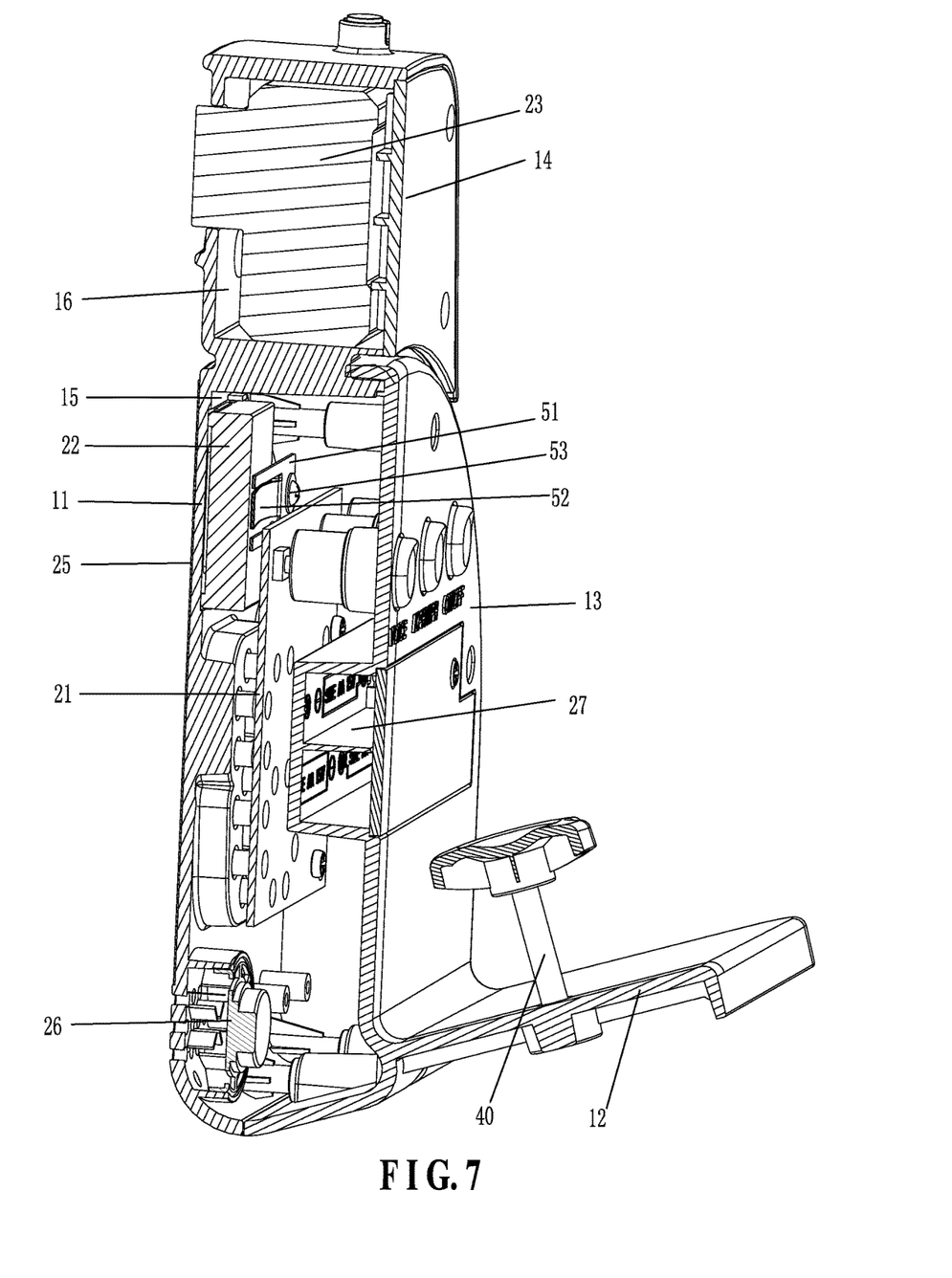
FIG. 7 is a sectional view according to the embodiment of the present invention.

In order to accommodate different ball motion trajectories, the horizontal bottom board 12 is provided with an angle adjustment mechanism for adjusting the inclination angle of the housing to obtain an optimum inclination angle, which is advantageous for achieving optimum angle shooting and speed measuring radar detection. The adjustment mechanism includes an adjustment hole formed in the horizontal bottom board 12 and an adjustment bolt 40 fitted in the adjustment hole. As shown in FIG. 7, by changing the length of the adjustment bolt 40 to extend downward out of the horizontal bottom board 12, the inclination angle of the housing is adjustable.

Figure 5:
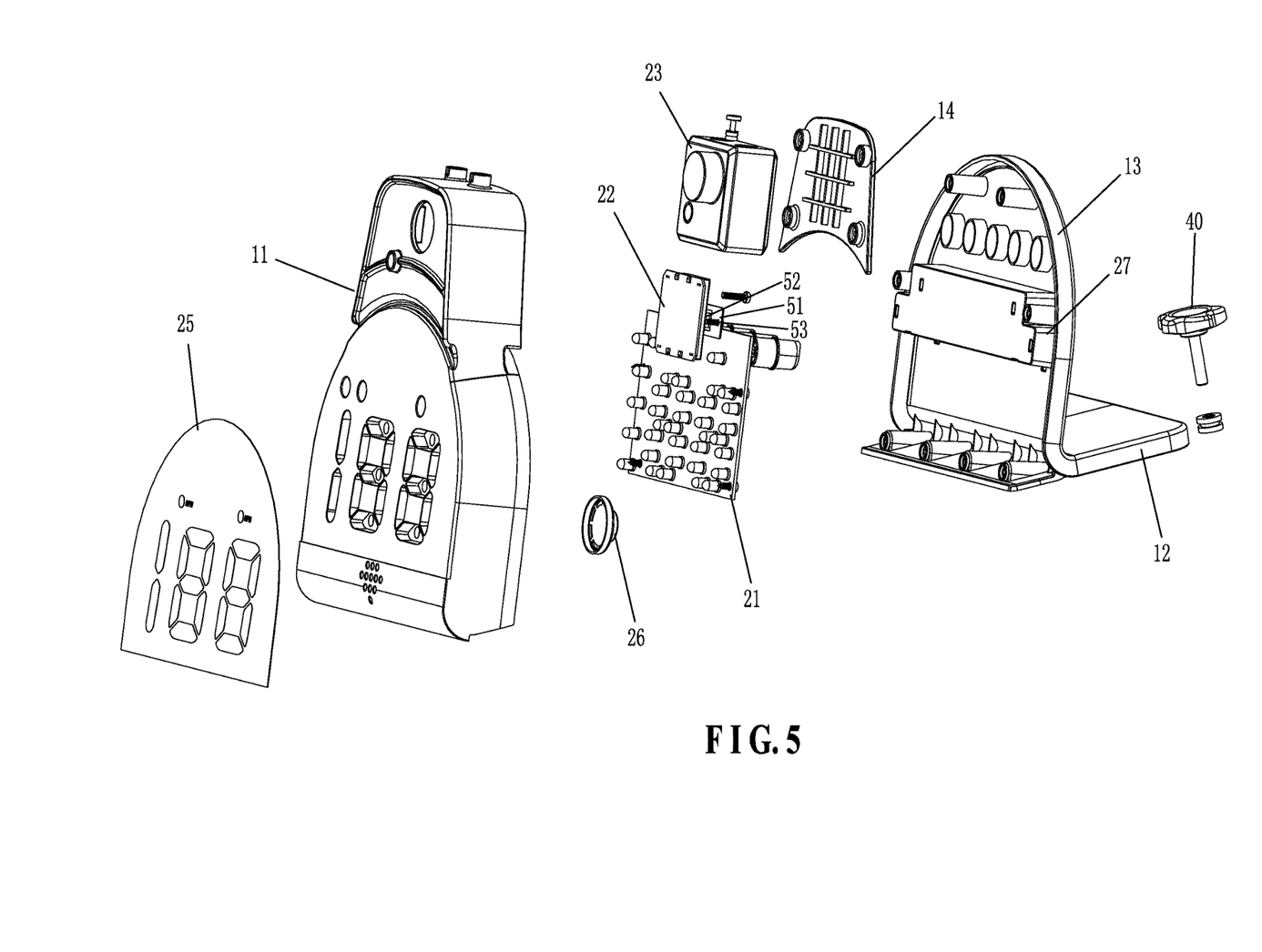
FIG. 5 is an exploded view according to the embodiment of the present invention.
Figure 6:
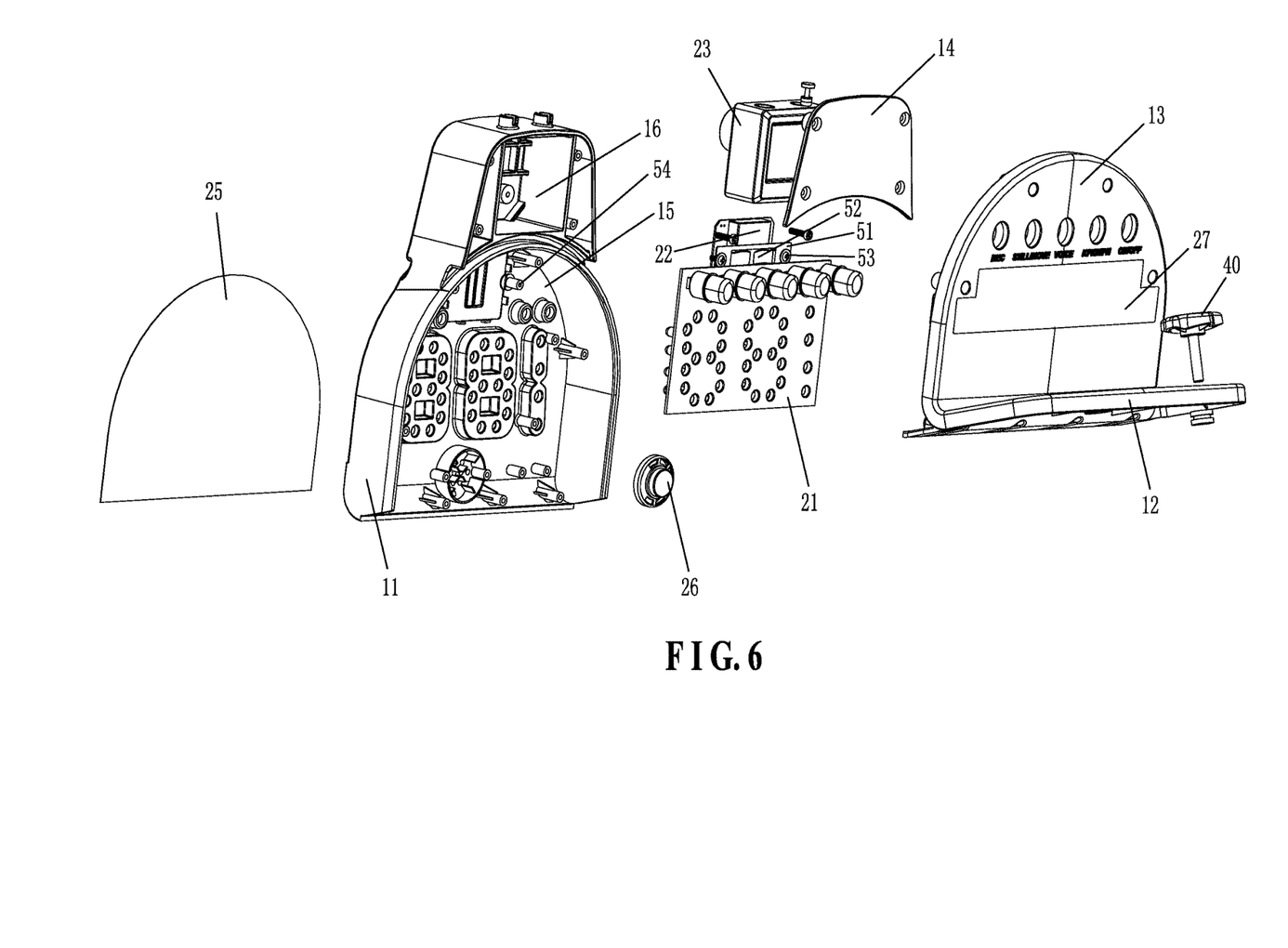
FIG. 6 is another exploded view according to the embodiment of the present invention.

In addition, it should be noted that the speed measuring unit 22 is a speed measuring radar module. The speed measuring radar module comprises a radar transmitter and a radar receiver. FIGS. 5 to 7 show the installation and positioning configuration of the speed measuring radar module.

Specifically, the speed measuring radar module includes an elastic fixing structure. The elastic fixing structure includes a positioning plate 51, a locking screw 53, and a connecting screw hole 54 protruding from the rear of the front cover 11. The positioning plate 51 is integrally formed with an elastic piece 52 extending toward the front cover 11 by punching. The positioning plate 51 is formed with a positioning hole, corresponding to one side of the elastic piece 52, for the locking screw 53 to be inserted therein. The locking screw 53 is inserted through the positioning hole and fitted in the connecting screw hole 54. The speed measuring radar module (i.e., the speed measuring unit 22) is confined between the rear of the front cover 11 and the positioning plate 51. The elastic piece 52 extends forward to lean against the speed measuring radar module.

Figure 1:
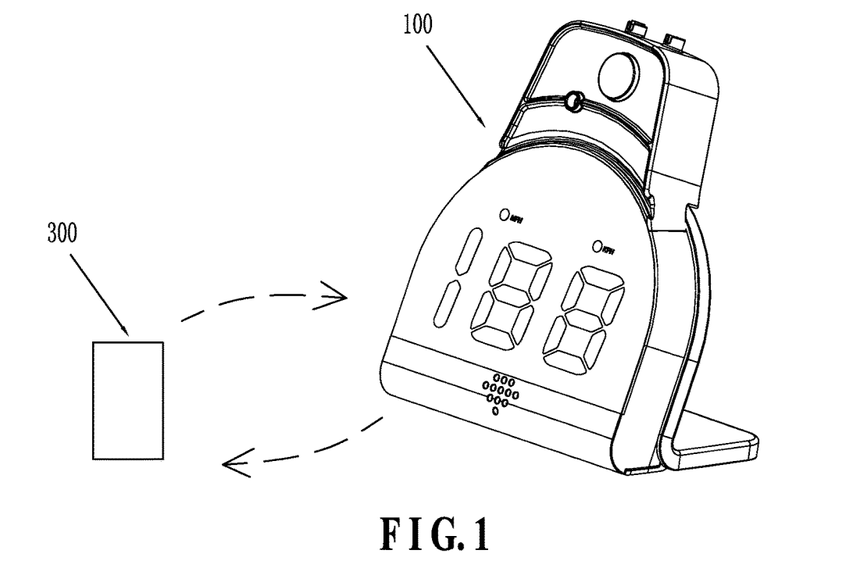
FIG. 1 is a first schematic view according to an embodiment of the present invention when in use.
Figure 2:
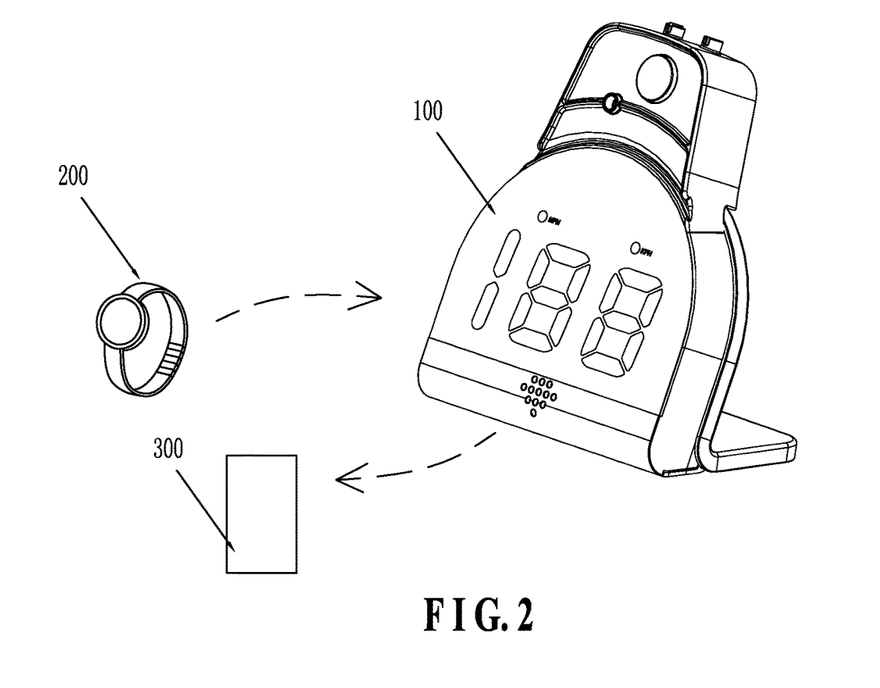
FIG. 2 is a second schematic view according to the embodiment of the present invention when in use.
Figure 3:
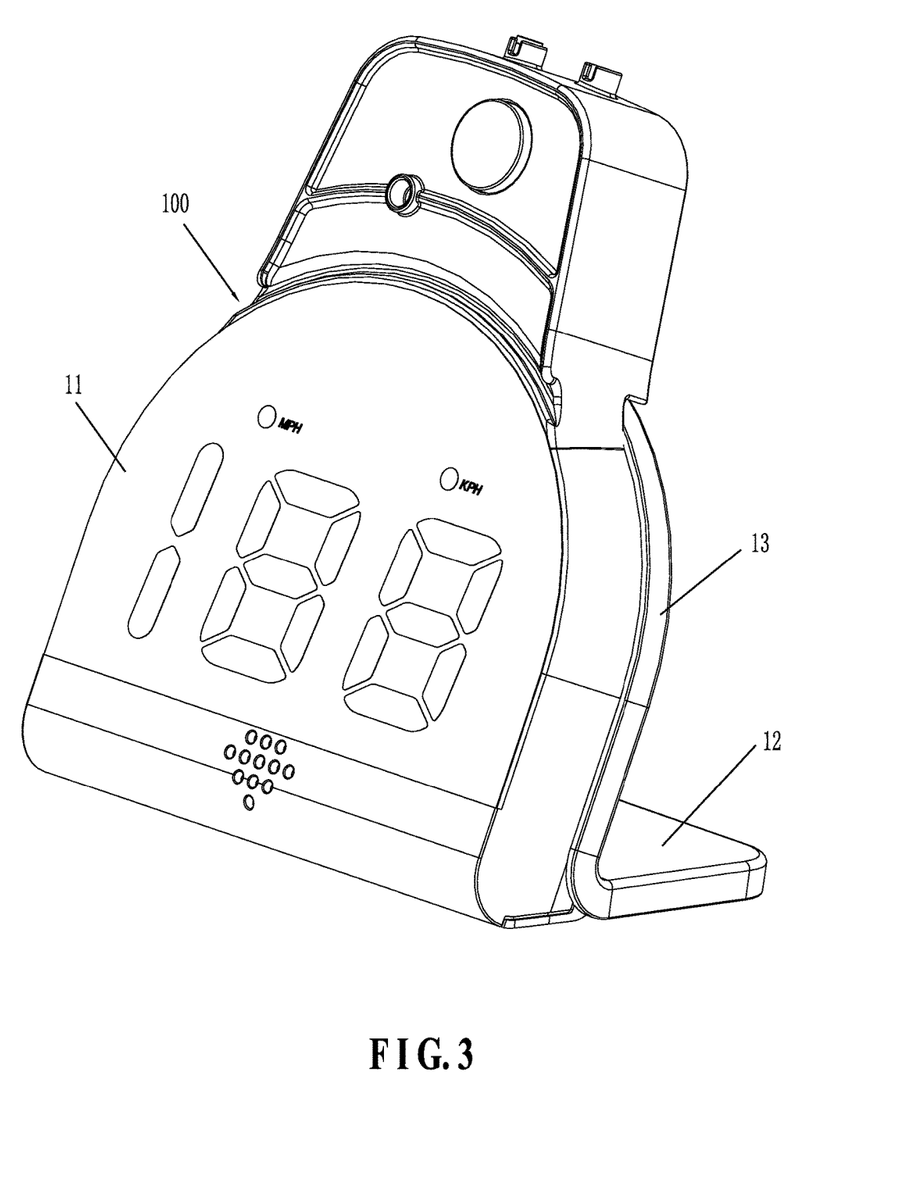
FIG. 3 is a front perspective view according to the embodiment of the present invention.
Figure 4:
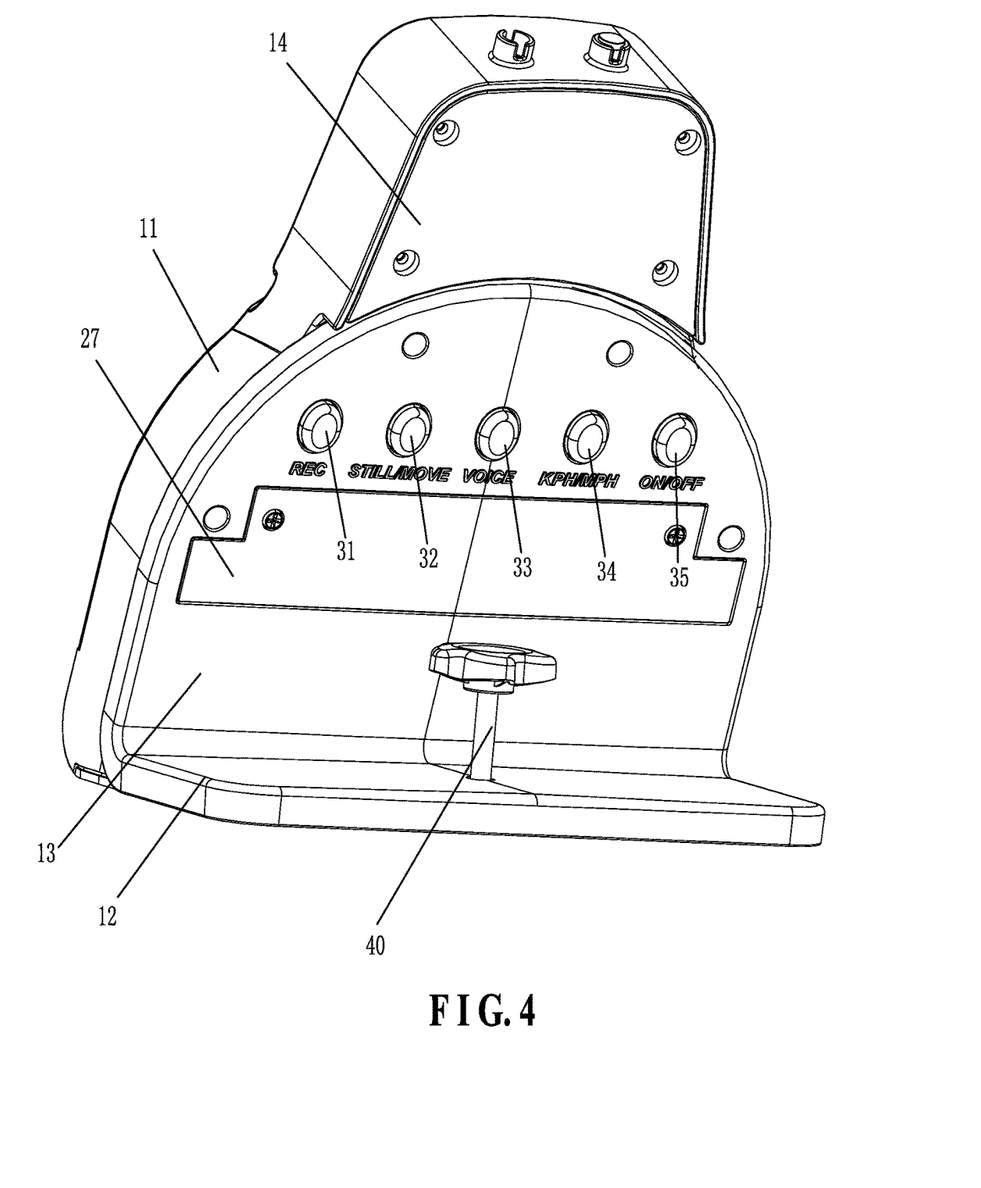
FIG. 4 is a rear perspective view according to the embodiment of the present invention.
Figure 8:
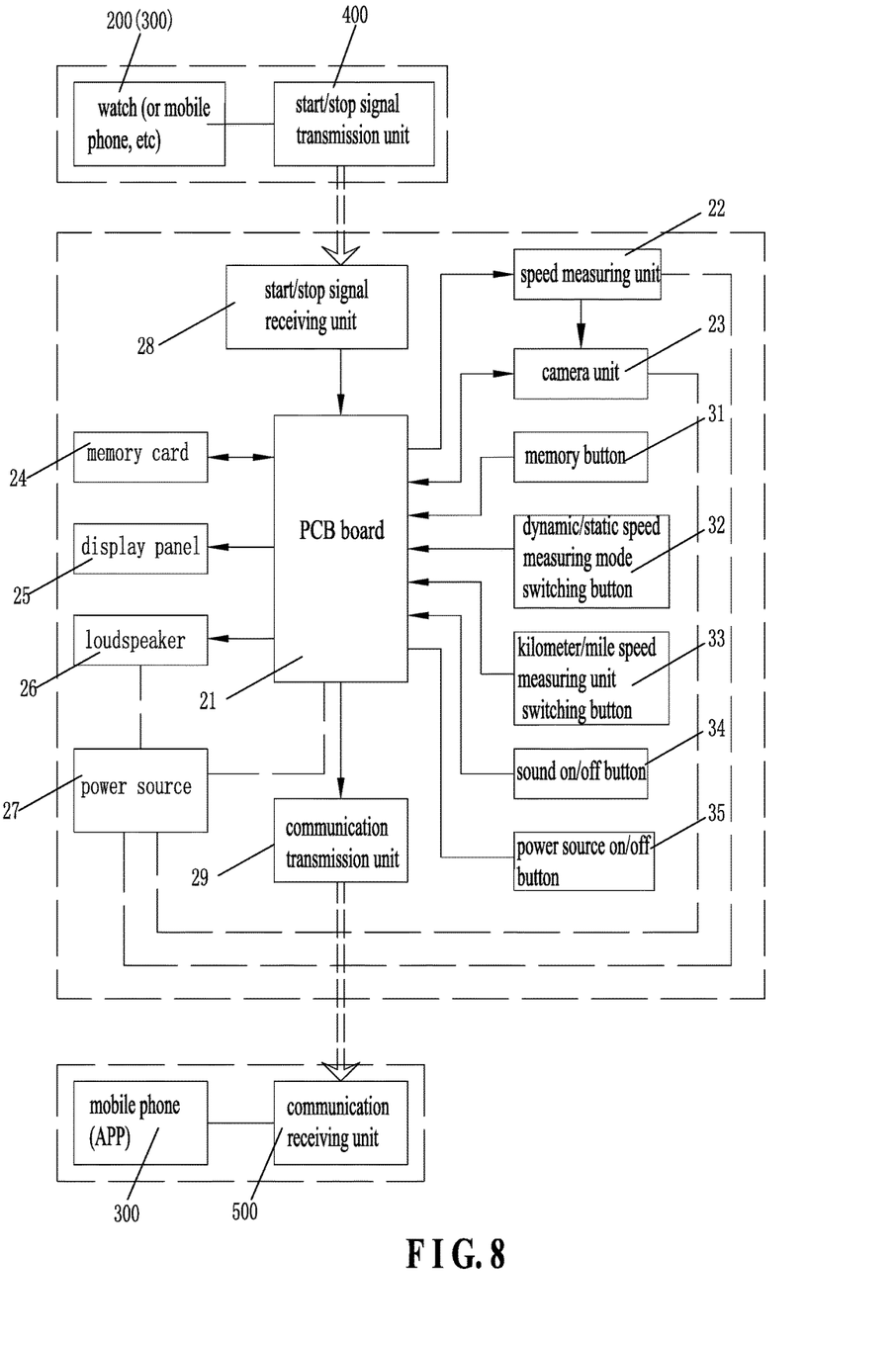
FIG. 8 is a block diagram according to the embodiment of the present invention.

Referring to FIG. 1, FIG. 2 and FIG. 8, (1) when in use, a start/stop signal transmission unit 400 transmits a signal to the ON/OFF signal receiving unit 28 by pressing a button of a watch 200 or a mobile phone 300 (preferably, a watch operation). After receiving the signal, the ON/OFF signal receiving unit 28 starts to measure the speed and photograph synchronously. After the user starts to exercise, the speed measuring unit 22 measures the motion and calculates the speed value. (2) After the motion is stopped, the speed measuring unit 22 stops measuring and delays a period of time (for example, three seconds). The speed value is communicated to the camera unit 23, and then the camera speed measuring of this stage is over. By repeating the aforesaid (1) (2), the desired multi-stage camera speed measuring can be obtained. (3) The camera signal and the speed measuring signal can be stored to the memory card 24 and downloaded to a computer or a handheld device for broadcasting, and can be communicated to a mobile phone APP via the communication transmission unit and a communication receiving unit 500 to display the video of the speed measuring value in real time.

The feature of the present invention is that the present invention is provided with the PCB board, the speed measuring unit, the camera unit, the memory card, the display panel, the loudspeaker, the power source, the start/stop signal receiving unit and the communication transmission unit. When in use, by pressing a button of a watch or a mobile phone, the ON/OFF signal receiving unit receives the signal and starts to measure the speed and photograph synchronously. The camera signal and the speed measuring signal can be stored to the memory card and communicated to a mobile phone APP via the communication transmission unit and the communication receiving unit to display the video of the speed measuring value on the mobile phone in real time. In this way, the speed of the ball can be displayed in the dynamic video in real time. It is convenient for people to watch and know the instantaneous corresponding speed of a different dynamic motion accurately, having great significance.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A ball game camera speed measuring machine, comprising a PCB board, a speed measuring unit, a camera unit, a memory card, a display panel, a loudspeaker, a power source, an start/stop signal receiving unit configured to receive a start/stop signal, and a communication transmission unit configured to transmit a video signal and a speed signal; the PCB board being connected with the start/stop signal receiving unit, the speed measuring unit, the camera unit, the memory card, the display panel, the loudspeaker and the communication transmission unit respectively, the power source supplying power to the loudspeaker, the PCB board, the speed measuring unit and the camera unit;
   wherein a housing comprises a front cover and a rear cover coupled to each other to form an accommodation chamber therebetween to receive the PCB board, the speed measuring unit, the camera unit, the memory card, the loudspeaker, the power source, the start/stop signal receiving unit and the communication transmission unit to be disposed in the accommodation space, wherein the rear cover has an L-shaped configuration comprising a horizontal bottom board and an oblique board that is obliquely connected to the horizontal bottom board; and
   wherein the horizontal bottom board is provided with an angle adjustment mechanism that comprises an adjustment hole formed in the horizontal bottom board and an adjustment bolt fitted in the adjustment hole, the adjustment bolt having a portion extending downward out of the horizontal bottom board for adjusting an inclination angle of the housing.

2. The ball game camera speed measuring machine as claimed in claim 1, wherein the PCB board is connected with a plurality of functional buttons, including a memory button, a dynamic/static speed measuring mode switching button, a kilometer/mile speed measuring unit switching button, a sound on/off button, and a power source on/off button.

3. The ball game camera speed measuring machine as claimed in claim 2, wherein the display panel is disposed on a front of the front cover.

4. The ball game camera speed measuring machine as claimed in claim 3, wherein the front cover is mated with and coupled to the oblique board.

5. The ball game camera speed measuring machine as claimed in claim 1, wherein the speed measuring unit is a speed measuring radar module, and the speed measuring radar module comprises a radar transmitter and a radar receiver.

6. The ball game camera speed measuring machine as claimed in claim 5, wherein the speed measuring radar module includes an elastic fixing structure, the elastic fixing structure includes a positioning plate, a locking screw and a connecting screw hole protruding from a rear of the front cover, the positioning plate is integrally formed with an elastic piece extending toward the front cover by punching, the positioning plate is formed with a positioning hole, corresponding to one side of the elastic piece, for the locking screw to be inserted therein; the locking screw is inserted through the positioning hole and fitted in the connecting screw hole, the speed measuring radar module is confined between the rear of the front cover and the positioning plate, and the elastic piece extends forward to lean against the speed measuring radar module.

7. The ball game camera speed measuring machine as claimed in claim 4, wherein the oblique board includes a first oblique board integrally connected to the horizontal bottom board and a second oblique board connected to an upper end of the first oblique board; a rear of the front cover is formed with a first accommodation chamber and a second accommodation chamber which are spaced apart from each other, the first oblique board is configured to cover the first accommodation chamber, the second oblique board is configured to cover the second accommodation chamber; the speed measuring unit is disposed in the first accommodation chamber, and the camera unit is disposed in the second accommodation chamber.

8. The ball game camera speed measuring machine as claimed in claim 7, wherein the memory button, the dynamic/static speed measuring mode switching button, the kilometer/mile speed measuring unit switching button, the sound on/off button, and the power source on/off button are arranged in a row on a rear side of the first oblique board.

9. The ball game camera speed measuring machine as claimed in claim 7, wherein a camera aperture of the camera unit is disposed on the front of the front cover.

10. The ball game camera speed measuring machine as claimed in claim 7, wherein a sound outlet of the loudspeaker is disposed on the front of the front cover.

* * * * *